United States Patent [19]

Rasmussen et al.

[11] Patent Number: 4,496,639
[45] Date of Patent: Jan. 29, 1985

[54] HYDROGEN SELENIDE TREATMENT OF ELECTROLYTES

[75] Inventors: James R. Rasmussen; Anil V. Virkar, both of Salt Lake City, Utah

[73] Assignee: Ceramatec, Inc., Salt Lake City, Utah

[21] Appl. No.: 510,818

[22] Filed: Jul. 5, 1983

[51] Int. Cl.³ .............................................. H01M 6/18
[52] U.S. Cl. ...................................... 429/193; 429/191
[58] Field of Search .................................. 429/191, 193

[56] References Cited

U.S. PATENT DOCUMENTS

| | | | |
|---|---|---|---|
| 4,246,081 | 1/1981 | Winnick | 204/426 X |
| 4,406,754 | 9/1983 | Narita et al. | 204/424 X |
| 4,407,912 | 10/1983 | Virkar et al. | 429/193 X |
| 4,425,415 | 1/1984 | Singh | 429/193 |

OTHER PUBLICATIONS

Powers et al., "An Effect of Furnace Atmospheres on the Sintering or Beta Alumina", *Ceramic Bulletin*, vol. 57, No. 4, pp. 456-458, 1978.

*Primary Examiner*—Brian E. Hearn
*Assistant Examiner*—Stephen J. Kalafut
*Attorney, Agent, or Firm*—Trask & Britt

[57] ABSTRACT

A method for lowering the activation energy of a polycrystalline ceramic electrolyte is disclosed. Polycrystalline ceramic electrolytes, such as beta-alumina, when contacted with hydrogen selenide exhibit a lower activation energy than untreated electrolytes.

7 Claims, 1 Drawing Figure

HYDROGEN SELENIDE TREATMENT OF ELECTROLYTES

BACKGROUND OF THE INVENTION

1. Field

This invention relates to treatments for enhancing the performance of polycrystalline ceramic electrolytes.

2. Prior Art

Treatment of polycrystalline ceramic electrolytes to enhance performance has generally involved storage in a desiccated environment to minimize water uptake and heating in situ in an electrolytic cell to attempt to dehydrate the cell.

DESCRIPTION OF THE INVENTION

Figure 1:
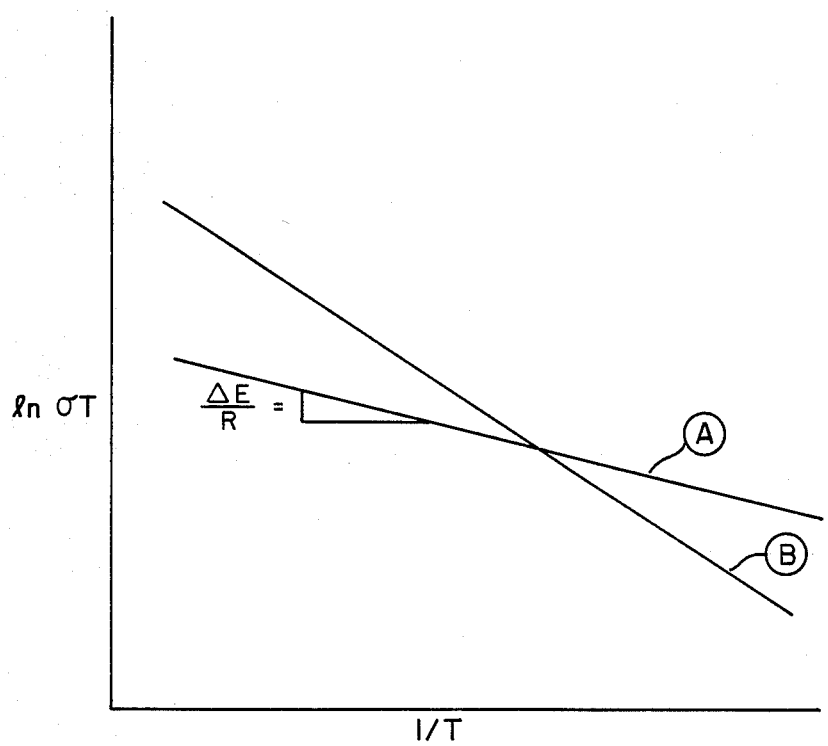
FIG. 1 is an Arrhenius plot of two representative electrolytes having different activation energies.

A method of improving the performance of a polycrystalline ceramic electrolyte has been invented.

In copending application of Miller and Virkar, Ser. No. 310,859, filed Oct. 13, 1981, now U.S. Pat. No. 4,407,912, it is disclosed that selenium has a beneficial effect on the performance of polycrystalline ceramic electrolytes. Various techniques were disclosed therein for introducing selenium to such an electrolyte or to a cell containing such an electrolyte.

The present invention involves the treatment of polycrystalline ceramic electrolytes, such as beta-alumina, beta″-alumina and NASICON, with hydrogen selenide, preferably as a gas, to introduce hydrogen selenide into the surface of such electrolytes. Electrolytes so treated experience a lowering of activation energy and preexponential factor. Conductance at lower temperatures is improved and electrolyte lifetime appears enhanced.

The polycrystalline ceramic electrolyte is contacted with hydrogen selenide gas at slightly elevated temperatures and for a period sufficient to cause uptake or entrapment of sufficient hydrogen selenide within the electrolyte at or adjacent the electrolyte surface to enhance the properties of said ceramic as an electrolyte. The electrolyte may be treated apart from an electrolytic cell or in situ prior to introduction of other cell components, such as the electrodes.

The polycrystalline ceramic electrolyte, such as beta″-alumina, may be treated with hydrogen selenide by exposing said electrolyte for a significant period of time to an atmosphere containing significant proportions of hydrogen selenide. Preferably, the treating atmosphere is pure hydrogen selenide, although gaseous mixtures such as mixtures of hydrogen selenide and air, hydrogen selenide and nitrogen and hydrogen selenide and various inert gases may be effectively utilized. Preferably, the moisture content of pure hydrogen selenide or hydrogen selenide-gas mixtures contain substantially no water. Although the hydrogen selenide treatment may be conducted at room temperatures, generally preferred slightly elevated temperatures from about 50° C. to about 500° C. may be utilized with a preferred temperature range of about 100° C. to 250° C. being very effective. The period of treatment may be from a few minutes, particularly at very elevated temperatures and concentrated hydrogen selenide gas environments, up to many hours, for example, as much as sixteen hours or more at 125° C.

Although the treatment typically takes place at pressures at about atmospheric pressure or perhaps slightly less than atmospheric to prevent leakage of hydrogen selenide gas from the treatment process into the atmosphere, super atmospheric pressures may be readily utilized to increase the amount of hydrogen selenide imparted to the electrolyte per unit time at any given temperature.

Electrolytes treated with hydrogen selenide may be utilized effectively for many purposes, for example, as an electrolyte in a sodium sulfur battery, as a refining membrane in a sodium-sodium electrolytic cell utilized to obtain pure sodium from an impure sodium source, and in electrowinning cells wherein a metal is recovered from a metal salt, e.g., sodium from sodium salts; and in a sodium heat engine wherein a polycrystalline ceramic membrane acts as an electrolyte between liquid sodium and vaporized sodium.

The treatment process may be conducted during the processing of electrolytes prior to storage or prior to insertion in an electrolytic cell, or the cell may be constructed containing the electrolyte and thereafter treated with hydrogen selenide. The treatment of an electrolyte as a portion of an electrolytic cell may be effective in also cleansing the cell of any unwanted moisture. The hydrogen selenide treatment may be performed on a polycrystalline ceramic electrolyte as a part of the sintering cycle where contact by hydrogen selenide with the electrolytes is made during the cooldown portion of a sintering cycle.

Frequently polycrystalline ceramic electrolytes are stored for some period after manufacture before being installed in an electrolytic cell. Conventionally such storage is done in desiccators whereby substantially anhydrous atmospheric conditions are maintained. Another effective manner of utilizing the technique of the instant invention is to store polycrystalline ceramic electrolytes in an atmosphere of hydrogen selenide or to treat the electrolytes with hydrogen selenide immediately prior to insertion of the electrolytes into a desiccated environment. Another technique for effectively storing polycrystalline ceramic electrolytes is to treat same with hydrogen selenide gas and then to immediately encase it in a moisture impervious plastic film envelope.

Upon treatment with hydrogen selenide it has been observed that polycrystalline ceramic electrolytes in an electrolytic cell thereafter demonstrate a decrease in activation energy. The decrease in activation energy indicates that the mobile metal ions in the electrolyte are more easily transported in a manner less dependent upon temperature from one surface to the other surface of the electrolyte under an appropriate electrical field.

Activation energy is $\Delta E$ in the following formula:

$$\sigma = \frac{\sigma_o}{T} \exp\left(\frac{\Delta E}{RT}\right)$$

wherein $\sigma_o$ is the preexponential factor, R is the universal gas constant, T is temperature and $\sigma$ is the conductivity.

In FIG. 1, an Arrhenius plot, the activator energies of two different electrolytes, Electrolyte A and Electrolyte B, are represented in a plot of $\sigma T$ versus $1/T$. The slope of each line is equal to $\Delta E/R$; thus the slope of the line is proportional to $\Delta E$ since R is a constant. Line A, which has a flatter slope than line B, has a lower activation energy than line B, which in terms of electrolytes represented by lines A and B means that Electrolyte A has a conductance (mobile ion transport) which is less temperature dependent than Electrolyte B.

Further understanding of the instant invention may be facilitated by reference to the following example:

EXAMPLE I

A sample of beta"-alumina was heated in hydrogen selenide gas for sixteen hours at 125° C. Following this treatment, the conductivity was measured at temperatures between 300° C. and 350° C. using sodium nitrate, sodium nitrite electrodes. The activation energy was found to be 1.65 kilocalories per mole and the preexponential factor was 560K (ohm-centimeter)$^{-1}$.

For an untreated sample of the same material, the activation energy was 4.44 kilocalories per mole and the preexponential factor was 6321K (ohm-centimeter)$^{-1}$.

The effect of hydrogen selenide on the polycrystalline ceramic may occur in one or more ways. The hydrogen selenide molecules may enter the conduction plane of the electrolyte, for example, beta"-alumina crystal, in much the same way as does water. Water molecules are highly mobile in the beta"-alumina structure. Once hydrogen selenide has entered into the structure in the form of hydrogen selenide, the selenium may exchange for oxygen or react with sodium in the beta"-alumina or the hydrogen selenide may decompose to leave a selenium residue within the ceramic body.

The presence of selenium at or near the surface of polycrystalline ceramic electrolyte is disclosed in the aforementioned copending application of Miller and Virkar.

The hydrogen selenide may further act as a dehydrating or desiccating agent, removing moisture or displacing moisture from the surface and even from the bulk of the electrolyte. Therefore, a superdehydrated electrolyte may be formed whereby substantially all the water is removed from the electrolyte. In most electrolytic cells employing a polycrystalline ceramic electrolyte, water may be expected to be present in sufficient quantities to be deleterious to the optimum operation of the cell and to the lifetime of the electrolyte.

In electrolytic cells, such as the sodium-sulfur battery, the presence of water at or near an electrolyte surface in contact with sodium could cause the formation of sodium hydroxides or sodium oxides which may then form a coating upon the electrolyte thereby increasing the resistance of the cell and minimizing further the conduction or transport of ions or a single ion from that portion of the cell to another portion of the cell.

The very significant decrease in activation energy indicates that some change has occurred within the electrolyte which permits ion transport which is less dependent upon the electrolyte temperature.

While the invention described herein has been done primarily with reference to hydrogen selenide, the similarities between hydrogen sulfide with hydrogen telluride with hydrogen selenide suggest hydrogen sulfide and hydrogen telluride as appropriate substitutes for hydrogen selenide in various steps of the inventive process.

Hydrogen selenide gas is rather toxic and caution should be observed during its handling. Hydrogen selenide has a strong odor so that any leaks can be easily detected.

We claim:

1. A method of adding selenium to a polycrystalline ceramic electrolyte comprising contacting said electrolyte with gaseous hydrogen selenide for a period sufficient to cause uptake of said hydrogen selenide by said electrolyte.

2. The method of claim 1 wherein said electrolyte is beta or beta"-alumina.

3. The method of claim 1 wherein said electrolyte is at a temperature of about 50° C. to about 500° C.

4. The method of claim 1 wherein said contacting is done under substantially anhydrous conditions.

5. The method of claim 1 wherein said contacting is done at pressures other than atmospheric.

6. The method of claim 1 wherein said contacting is performed in a sintering furnace during its cool-down cycle.

7. The method of claim 1 wherein said electrolyte is present in an electrolyte cell assembly.

* * * * *